United States Patent
Liindberg et al.

(10) Patent No.: US 6,341,918 B1
(45) Date of Patent: *Jan. 29, 2002

(54) DETACHABLE JOINT

(75) Inventors: Staffan Liindberg; Staffan Garras, both of Edsbyn; Tord Englund, Alfta, all of (SE)

(73) Assignee: Sandvik A.B., Sandviken (SE)

( * ) Notice: Subject to any disclaimer, the term of this patent is extended or adjusted under 35 U.S.C. 154(b) by 0 days.

This patent is subject to a terminal disclaimer.

(21) Appl. No.: 09/529,276
(22) PCT Filed: Oct. 14, 1998
(86) PCT No.: PCT/SE98/01850
§ 371 Date: Jun. 16, 2000
§ 102(e) Date: Jun. 16, 2000
(87) PCT Pub. No.: WO99/20909
PCT Pub. Date: Apr. 29, 1999

(30) Foreign Application Priority Data

Oct. 17, 1997 (SE) ............................................... 9703791

(51) Int. Cl.⁷ ................................................. F16B 21/09
(52) U.S. Cl. ...................... 403/348; 403/353; 24/3.12; 24/597; 24/701
(58) Field of Search .................. 403/348, 350, 403/353, 316, 319, 315; 24/669, 667, 597, 702, 701, 663, 590, 3.12; 30/151, 514; 206/349; 224/197, 269

(56) References Cited

U.S. PATENT DOCUMENTS

| 3,878,589 A | * | 4/1975 | Schaefer ....................... 24/669 |
| 4,419,794 A | * | 12/1983 | Horton, Jr. et al. ........... 24/667 |
| 4,605,335 A | * | 8/1986 | Otrusina ....................... 403/348 |
| 5,054,170 A | * | 10/1991 | Otrusina ....................... 24/597 |
| 5,597,102 A | * | 1/1997 | Saarikko et al. ............. 224/197 |
| 6,059,156 A | * | 5/2000 | Lehtinen ...................... 224/197 |
| 6,076,261 A | * | 6/2000 | Eriksson et al. .............. 30/151 |

FOREIGN PATENT DOCUMENTS

| GB | 2302561 | 1/1997 |
| GB | 2293857 | 4/1998 |

* cited by examiner

Primary Examiner—Harry C. Kim
(74) Attorney, Agent, or Firm—Burns, Doane, Swecker & Mathis, L.L.P.

(57) ABSTRACT

A securing arrangement for releasably connecting two items comprises two elements. One of the elements is provided with hole with one wide section and one narrower section. The other element is provided with a peg opposite to and facing into the narrower hole section. The other item has a horseshoe-shaped protrusion with an inner waist and an outer collar, both of which has a lateral opening. To connect the items, the horseshoe-shaped protrusion with its collar is inserted laterally through the wide section of the hole with the lateral opening oriented towards the peg, and then longitudinally moved from the wide section into the narrower section to let the horseshoe-shaped protrusion enclose the peg. The items are secured by rotating relative to each other.

5 Claims, 1 Drawing Sheet

DETACHABLE JOINT

PURPOSE AND FEATURES OF THE INVENTION

The present invention has been developed to connect a saw sheath to a holder fastened to a belt in a way that allows the sheath to rotate relative to the holder, and to be easily released from the holder when desired. It can, however, be more generally used to connect two items of arbitrary kind with a detachable joint. A connection means for that purpose according to the invention is defined in the following claims.

DETAILED DESCRIPTION OF A PREFERRED EMBODIMENT OF THE INVENTION

Figure 1:
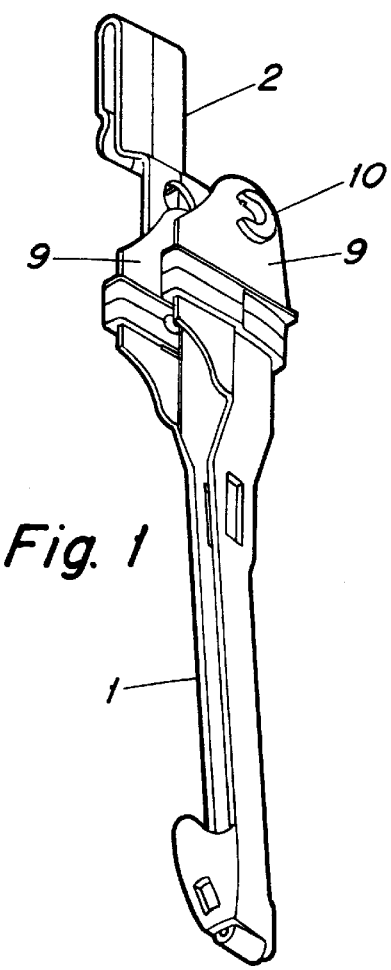
FIG. 1 is a perspective view of a saw sheath with a holder, releasably joined to the sheath.
Figure 2:
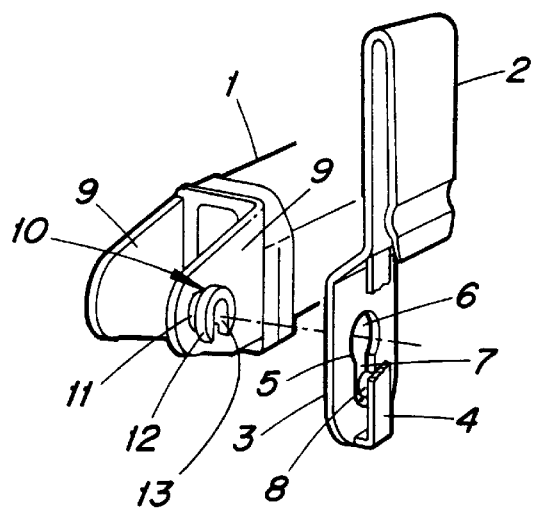
FIGS. 2–5 are perspective views of the connection means in four states of operation.
Figure 3:
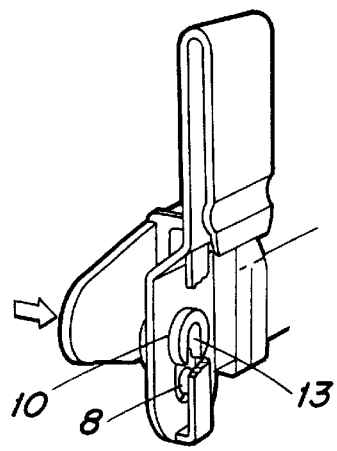
Figure 4:
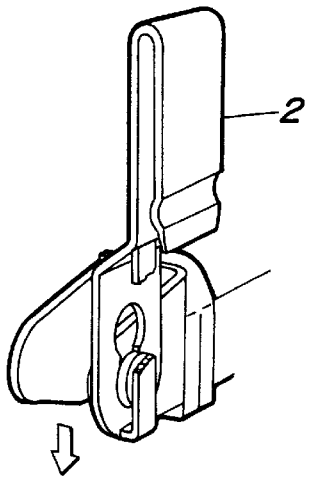
Figure 5:
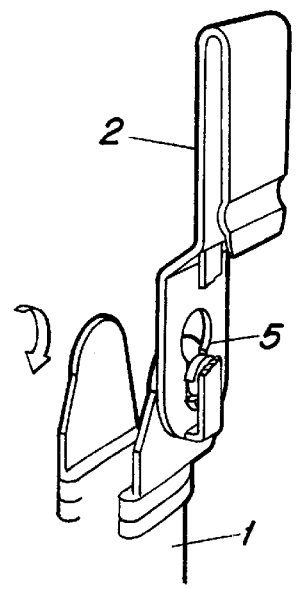

In FIG. 1, a saw sheath (1) is designed to receive a hand saw and to be carried by a belt. For this purpose, the sheath is connected to a holder item (2) which has a U-shaped clasp to be hooked onto the belt. The sheath and the holder can both be made from injection molded polymer material. FIGS. 2–5 show details of the connection means. The lower part of the holder (2) comprises a first flat element (3) which at its lower edge is connected to a second flat element (4) which is narrower than the first element. The first element (3) is provided with a through hole (5) which is keyhole-shaped, more specifically comprising a wide section (6), preferentially circular, and a narrower section (7) with elongated section. In practise, the round wide section (6) could have a diameter 1.5 to 2 times the width of the narrower section (7). On the inside of the second flat element (4) is a peg (8) located facing the lower portion of the narrow section (7) of the hole. In practise, the peg could be cylindrical and made integral with the flat element (4).

At its upper end the sheath (1) is provided with two parallel flanges (9), each of them provided with a horseshoe-shaped protrusion (10) on its outside. More specifically, the protrusion (10) comprises an inner waist (11) protruding at right angle from the flange (9) with a collar or thicker portion (12) at the outer end. The waist (11) and the collar (12) have a common lateral opening (13), in the described application facing at right angle to the longitudinal direction of the sheath. The outer diameter of the collar (12) should be slightly less than the diameter of the round hole section (6), but considerably larger than the width of the narrow hole section (7). The diameter of the waist (11) should be slightly less than the width of the narrow section (7).

The function of the connection means is shown from FIGS. 2–5. When the sheath is to be connected to the holder, the items are oriented at right angle to each other, and the horseshoe-shaped protrusion (10) is inserted through the wide hole section (6) as shown with an arrow in FIG. 3. In the next step, shown in FIG. 4, the horseshoe-shaped protrusion is made to slide down into the narrow hole section (7) until it encloses the peg (8) on the inside of the flat element (4). As a last step according to FIG. 5, the sheath is rotated 90 degrees to hang freely downwards from the holder. In this position it can swing freely relative to the holder, but is at the same time secured to the holder since the peg (8) penetrates the horseshoe-shaped protrusion and prevents vertical displacement between the sheath and the holder.

Only by rotation of the sheath back to 90 degrees angle to the holder, can the sheath be intentionally disconnected from the holder, by sliding the horseshoe-shaped protrusion up to the wide hole section (6) from where it can be pulled out from the hole. As shown in FIG. 1, the lateral opening (13) is located in the same direction as an open groove of the sheath (1). When the sheath is carried hanging down from the belt of an operator, the groove is turned forward. When thus the lateral opening also faces forward, the risk of unintentional disconnecting of the sheath from the holder is minimized, since it can only occur in one position, when it is pointing 90 degrees backwards. It is very unlikely that the sheath should assume this position unintentionally during actual use, and connection or disconnection will thus occur only by intentional positioning of the items.

The invention is not restricted to connecting of a saw sheath to a belt hanger. It can be applied to jointed releasable connection between two arbitrary items, where there is a need for swinging relative mobility combined with releasability of the connection. There are also several obvious variations of the design, such as providing the collar (12) and the wide hole section (6) with centering means to facilitate disconnection after the horseshoe-shaped protrusion has been moved away from the narrow section (7).

What is claimed is:

1. A securing arrangement for releasably connecting first and second items, wherein said first item including two elements, one of said elements being provided with a generally keyhole-shaped through hole having a first section and a second section narrower than the first section, and the other of said elements carrying a peg located opposite to and facing the second, narrower section;

said second item being provided with a generally horseshoe-shaped protrusion with an inner waist which carries a collar, the waist and the collar having a common lateral opening, said horseshoe-shaped protrusion being insertable through the first section with the lateral opening turned towards the peg and thereafter slidable from the first section into the second, narrower section to let the horseshoe-shaped protrusion enclose the peg, whereafter the first and second items are secured by rotation of the peg with respect to the horse-shaped protrusion.

2. The securing arrangement of claim 1, wherein a diameter of said collar is smaller in width than a diameter of said first section.

3. The securing arrangement of claim 2, wherein a diameter of said collar is greater in width than a diameter of said second, narrower section.

4. A method for securing first and second items together, comprising the steps of:

providing a first item having two elements, one of said elements being provided with a generally keyhole-shaped through hole having a first section and a second section narrower than the first section, and the other of said elements carrying a peg located opposite to and facing the second, narrower section;

providing a second item having a generally horseshoe-shaped protrusion with an inner waist which carries a collar, the waist and the collar having a common lateral opening;

inserting the horseshoe-shaped protrusion through the first section with the lateral opening turned towards the peg;

sliding the horseshoe-shaped protrusion from the first section into the second, narrower section to let the horseshoe-shaped protrusion enclose the peg; and rotating the peg with respect to the horse-shaped protrusion.

5. A securing arrangement for connecting first and second items, comprising:

first connecting means disposed on said first item, said first connecting means including an aperture having first and second portions, wherein the first portion is wider than said second portion;

second connecting means disposed on said first item, said second connecting means being substantially parallel to said first connecting means and disposed opposite to and facing the second portion of said first connecting means, said second connecting means including a peg; and third connecting means disposed on said second item, said third connecting means including a horse-shoe shaped protrusion having a waist and a collar with a common lateral opening, said horse-shoe shaped protrusion being insertable through the first portion of said aperture of said first means and slidable onto the peg of said second connecting means.

* * * * *

UNITED STATES PATENT AND TRADEMARK OFFICE
CERTIFICATE OF CORRECTION

PATENT NO.     : 6,341,918 B1
DATED          : January 29, 2002
INVENTOR(S)    : Staffan Lindberg et al.

Page 1 of 1

It is certified that error appears in the above-identified patent and that said Letters Patent is hereby corrected as shown below:

<u>Title page,</u>
Item [75], Inventors, change "Staffan Liindberg" to -- Staffan Lindberg --.

Signed and Sealed this

Fourth Day of February, 2003

JAMES E. ROGAN
*Director of the United States Patent and Trademark Office*